July 26, 1955        L. L. BALSAM        2,713,727
LINEAR BUBBLE LEVEL SIGNAL DEVICE
Filed Dec. 20, 1948        2 Sheets-Sheet 2
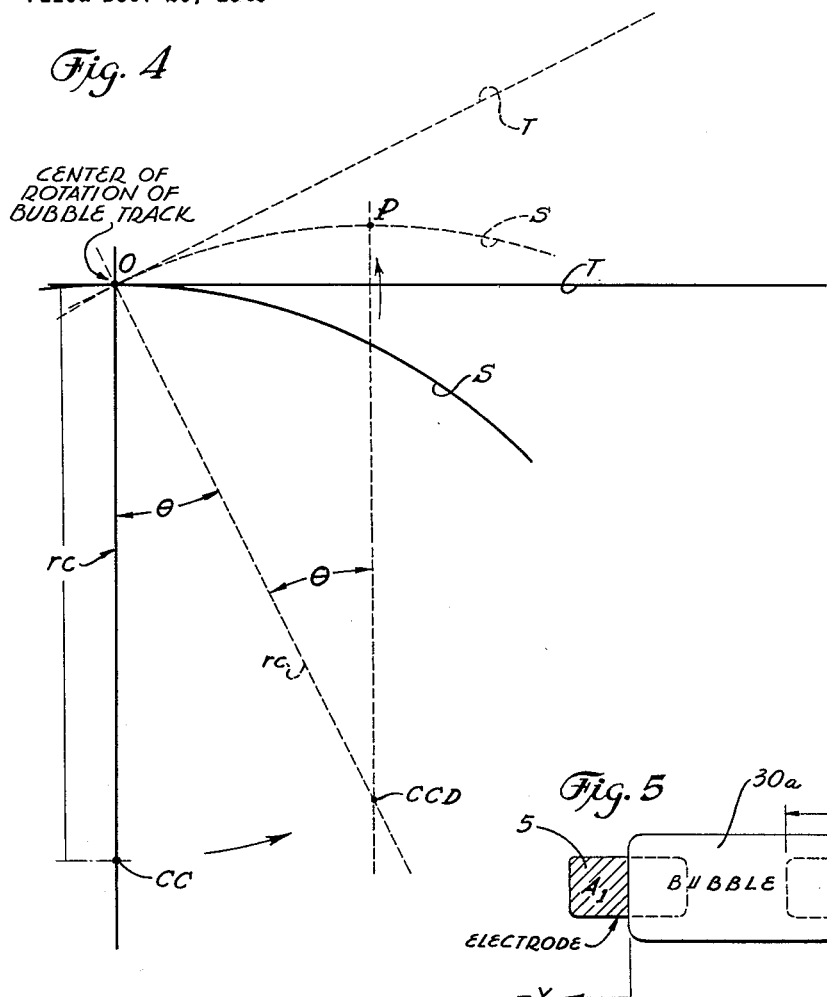
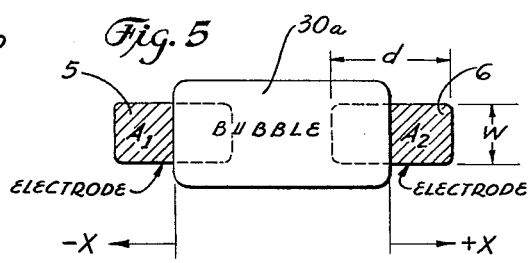
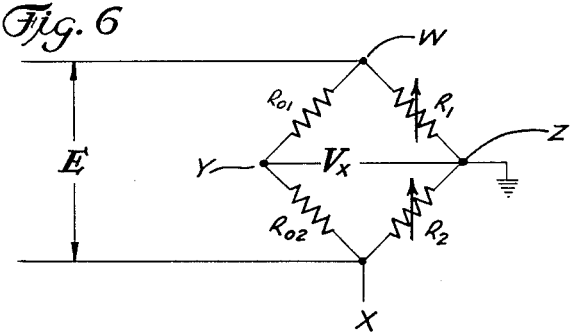
INVENTOR.
L. LLOYD BALSAM
BY
Herbert E. Metcalf
ATTORNEY United States Patent Office 2,713,727
Patented July 26, 1955

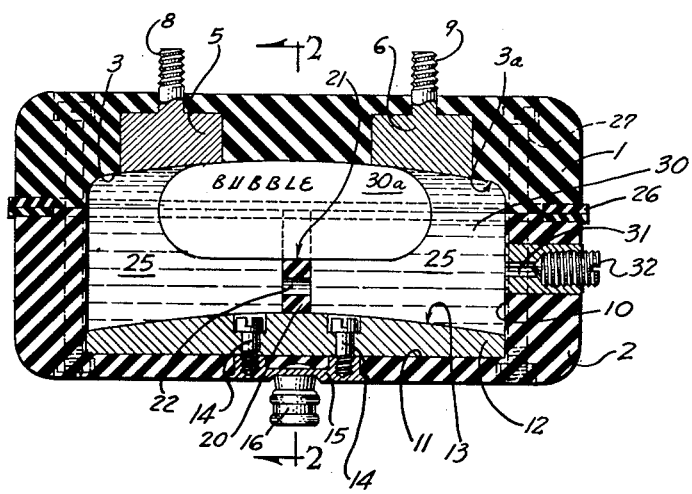

2,713,727

LINEAR BUBBLE LEVEL SIGNAL DEVICE

Louis Lloyd Balsam, Pacific Palisades, Calif., assignor to Northrop Aircraft, Inc., Hawthorne, Calif., a corporation of California Application December 20, 1948, Serial No. 66,370

15 Claims. (Cl. 33—211)

My invention relates to levels of the bubble type, and more particularly to a means and method of generating a signal that is a linear function of the angular displacement of the level. This invention is an improvement on the device shown, described and claimed in the copending application of B. E. Dixon, filed September 23, 1948, as Serial No. 50,770.

In an automatic navigation device for example, it is highly desirable to compare the angular relationship of one portion of the device with the apparent vertical. One such specific problem is to measure the departure of a vertical seeking gyroscope rotor from the apparent vertical such as might, for example, be indicated by the position of a bubble in a bubble level. It is highly desirable, under these circumstances, that bubble displacements be measurable directly to provide a signal that is a linear function of angular displacement of the level.

It is an object of the present invention to directly and electrically measure the displacement of a bubble in a bubble level.

It is another object of the present invention to provide a bubble level in which the bubble motion therein has a linear relation to the angular displacement of the bubble level.

And it is still another object of the invention to provide a means and method of generating an electrical signal that is a linear function of the displacement of a bubble level.

In broad terms as to method, the invention provides for passing a current through a conducting fluid in a bubble level in which a bubble is present, and positioning the bubble to intersect the current path during angular level displacement to obtain a current change, this current change being measured as a signal that is a linear function of displaceemnt of the level.

In broad terms as to apparatus, the present invention involves the use of a bubble level in which a chamber having an incomplete filling of an electrolyte fluid therein to provide a bubble which, when he device is level, preferably bisects a pair of spaced electrodes on a curved upper surface of the chamber. A single curved and third electrode is concentrically positioned in the bottom of the chamber. When in use, the two electrolyte paths between the two top electrodes and the single bottom electrode are preferably utilized as resistances in a bridge circuit. Movement of the bubble across the electrodes as the angular position of the level changes, changes the bridge conditions and provides an output signal that is a linear function of level displacement. Means are also preferably included in the level to damp the movement of the bubble.

The above and other objects and advantages of the present invention will be more apparent from the following description of a preferred form of the invention shown in the drawings, in which:

Figure 1 is a diagrammatic longitudinal sectional view of a bubble level embodying the present invention.

Figure 2 is a cross-sectional view of the level shown in Figure 1, taken as indicated by line 2—2 in Figure 1.

Figure 3 is a top plan view, taken as indicated by line 3—3 in Figure 2, of the lower half of the bubble level of Figures 1 and 2.

Figure 4 is a diagram showing the displacement geometry of the level shown in Figures 1-3 inclusive.

Figure 5 is a diagram showing the area relation of the bubble and the upper electrodes of the level.

Figure 6 is a wiring diagram showing one form of circuit used with the device of Figures 1 and 2 for measuring bubble displacement in linear terms.

The bubble level, as shown in Figures 1, 2 and 3, is formed from mating upper and lower insulating blocks 1 and 2 respectively. A bubble track 3 is milled in the upper block 1. This track 3 is provided with an upper surface 3a longitudinally curved on a constant radius and substantially flat laterally across the track. However, the lateral sides 4 of the track are curved to fit the contour of a bubble that is to fit the track in cross-section, as shown in Figure 2.

Equally spaced, fore-and-aft of the center line of the upper block, are two spaced electrodes 5 and 6 having surfaces forming a part of the upper surface 3a and milled or otherwise machined to the same curvature as the upper surface. Preferably the electrodes 5 and 6 are molded into the upper block 1 and then the track is machined into the block so that the same machining operation shapes both the block and the electrodes to the desired curvature. Both electrodes 5 and 6 are provided with external studs 8 and 9 respectively.

The lower block 2 is also hollowed out, with straight sides 10 and flat bottom 11. In this bottom is positioned a bottom electrode 12 having a longitudinally curved surface 13 concentric with that of the upper track surface 3a. The lateral extent of the curvature 13 is straight.

Bottom electrode 12 is held in the bottom of the hollow by two screws 14 passing through the block to engage a stud plate 15 carrying a single bottom connection stud 16.

The lower electrode is also bisected by a baffle 20 of insulating material extending upwardly to the upper level of the lower block, and is there provided with a cutout 21 to fit normal bubble contour. Baffle 20 is also provided with damping holes 22.

A bubble chamber 25 is formed by fitting the upper and lower blocks 1 and 2 together with gaskets 26 therebetween, the blocks being held by vertical screws 27. As put together, the two blocks fit to position the baffle 20 in a plane midway in the space between upper electrodes 5 and 6 in a midplane intersecting the highest extent of the curvature of surfaces 3a and 13.

Electrolyte 30 is introduced through a filling hole 31 in the lower block 2 to form a bubble 30a and hole 31 is sealed with a screw 32. As the bubble size is to be such as to exactly bisect the two upper electrodes when the level is level and at rest, the volume of the interior of the level may be carefully calculated, for example, as is also the proposed size of the bubble 30a. The device is then filled with the proper amount of electrolyte and tested to determine bisection of the electrodes. Electrolyte (and/or air) is then admitted or taken away from the chamber until the bubble size is correct. Alternatively, the upper and lower blocks can be made of clear plastic and the bubble size visually adjusted, with a final electrical test for bisection.

One preferred low viscosity, low surface tension liquid preferred for use in the bubble level embodying the present invention is 200 proof (100%) ethyl alcohol. This is made conducting by the addition of .08 gram of sodium iodide per 100 milliliters of the alcohol.

With upper and lower surfaces of the bubble level chamber concentric, the geometric relation of the bubble during level displacement with respect to the bubble track is shown in Figure 4. In this drawing, the solid line S represents the bubble track surface, solid line $rc$ represents a vertical dropped from the center of rotation O of the bubble track, to the center of curvature CC of the upper bubble track surface, and solid line T represents the tangent to the undisplaced bubble track through center of rotation O of the track. Thus, line $rc$ represents the radius of curvature of the upper bubble track.

When the bubble level is rotated around the center of rotation O of the track, to provide an angle $\theta$ between the original radius $rc$ and a new radius position that is assumed when the center of curvature CC is moved to a point CCD, the position of the track surface line S, radius $rc$ and tangent T is shown in broken lines. Point P is then the point at which the bubble will settle for the angular displacement $\theta$. Using the geometry shown in Figure 4, the proof that bubble motion along the track will be a linear function of the tilt of the bubble level is as follows:

Let $x$ = displacement of bubble center of gravity along track
$rc$ = radius of curvature of bubble track
$\theta$ = angular displacement of bubble track then $\widehat{OP} = rc\theta$ $x = \widehat{OP}$ by definition therefore $$x = rc\theta = f(\theta) \qquad (1)$$

The relationship between the resistance through the electrolyte bubble chamber across an upper electrode and the lower electrode, and the position of the bubble $30a$ along the track can be derived from the geometry of Figure 4 and of Figure 5. In this latter figure, the bubble $30a$ bisects electrodes 5 and 6 which have an area of width $w$ and a length $d$ exposed to the electrolyte.

Let $R_1$ = resistance through the electrolyte between upper electrode 5 and the bottom electrode 12
$R_2$ = resistance through the electrolyte between upper electrode 6 and the bottom electrode 12
$L$ = distance between upper and lower electrodes through electrolyte, i. e., length of current path $L \neq f(x)$
$d$ = length of each upper electrode
$w$ = width of each upper electrode
$A_1$ = area of one electrode 5 in contact with the electrolyte (corresponding to resistance $R_1$)

$A_1 = w\left(\dfrac{d}{2} + x\right)$ in range from $\dfrac{d}{2}$ to $-\dfrac{d}{2}$ $A_2$ = area of the other electrode 6 in contact with the electrolyte (corresponding to resistance $R_2$)

$A_2 = w\left(\dfrac{d}{2} - x\right)$ in range from $\dfrac{d}{2}$ to $-\dfrac{d}{2}$ $K$ = resistivity of electrolyte
$R_B$ = null value of $R_1$ and $R_2$
$A_0$ = null value of $A_1$ and $A_2$ To determine $R_1 = f_1(x)$, $R_2 = f_2(x)$:

$$R_B = \dfrac{KL}{A_0} = \dfrac{KL}{w\dfrac{d}{2}}$$

$$\dfrac{KL}{w} = \dfrac{d}{2} R_B$$

$$R_1 = \dfrac{KL}{A_1} = \dfrac{KL}{w\left(\dfrac{d}{2}+x\right)} = R_B \dfrac{d/2}{(d/2+x)} = R_B \dfrac{d}{d+2x} \qquad (2)$$

$$R_2 = \dfrac{KL}{A_2} = \dfrac{KL}{w\left(\dfrac{d}{2}-x\right)} = R_B \dfrac{d/2}{d/2-x} = R_B \dfrac{d}{d-2x} \qquad (3)$$

Q. E. D.

However, even if the bubble motion is linear along the track, with respect to angular displacement of the level, the resistance changes are not necessarily linear with respect to the displacement angle $\theta$. I, therefore, provide a linear signal by the use of the bridge circuit shown in Figure 6 where $E$ = an A. C. energizing voltage, $V_x$ = the output of the bridge and $R_{o1}$ and $R_{o2}$ are external fixed (and equal) bridge resistors.

And where $R_1$ and $R_2$ are the resistances between upper electrodes 5 and 6, respectively, and the bottom electrode 12.

Point W is the junction of one end of resistor $R_{o1}$ with upper electrode 5.

Point X is the junction of one end of resistor $R_{o2}$ with upper electrode 6.

Point Y is the junction of the other ends of resistors $R_{o1}$ and $R_{o2}$.

Point Z is the lower electrode 12.

The voltage E is applied across points W and X and the output $V_x$ is taken across points Y and Z.

Point Z, i. e., the lower electrode 12, is grounded.

It will be assumed that the length of fluid path between the upper electrodes and the bottom electrode $\neq f(\theta)$.

In addition, it will be assumed that there is ½ null resistance for an electrode completely exposed to the electrolyte, and that there is infinite resistance for an electrode completely covered by the bubble.

Let $$R_{o1} = R_{o2} = R_B$$

$$R_1 = R_B\left(\dfrac{d}{d+2x}\right) \qquad (2)$$

and $$R_2 = R_B\left(\dfrac{d}{d-2x}\right) \qquad (3)$$

To find $V_x = f(\theta)$:

$$V_x = E\dfrac{R_1}{(R_1+R_2)} - \dfrac{E}{2} = \dfrac{E}{2} \cdot \dfrac{(R_1-R_2)}{(R_1+R_2)}$$

$$V_x = E\dfrac{R_B\left[\dfrac{d}{d+2x} - \dfrac{d}{d-2x}\right]}{2R_B\left[\dfrac{d}{d+2x} + \dfrac{d}{2-2x}\right]} = -E\dfrac{x}{d}$$

$$x = rc\theta \qquad (1)$$

therefore $$V_x = \dfrac{Erc}{d}\theta \qquad (4)$$

Q. E. D.

Equation 4 thus expresses the linear signal-angle characteristic desired. It should be pointed out, however, that if the bridge circuit is not connected as shown in Figure 6 but instead the A. C. input and signal output terminals are reversed, the signal-angle characteristic will be non-linear.

Referring back to the linear circuit of Figure 6, an increase in resistance $R_1$, for example, will be accompanied by a corresponding decrease of resistance $R_2$. These variations in the bridge circuit will produce a directional voltage signal in output $V_x$ that is a function of the angular displacement or acceleration of the bubble chamber. Using an A. C. supply, for example, as in the present embodiment of the invention, the bubble sense right or left of a known mid-position is indicated by the phase relationship of the output voltage with respect to supply voltage. The output is in phase with the supply on one side of the null and 180° out of phase at the other side of the null. When using D. C. supply, the bubble sense right or left of the known mid-position is indicated by the reversed polarity of the output lines.

A. C. supply is preferable to D. C. to minimize electro-chemical action in the electrolyte and at the electrode surfaces.

The vertical baffle and the damping apertures 22 therein integrate random short period regular or intermittent accelerations and angular displacements. The damping apertures 22 restrict the flow of electrolyte along the bottom of the chamber and hence controls the rate of change of bubble position. The rate of change is a function of aperture 22 area. For a particular set of conditions, the size of this aperture may be fixed.

It should be noted that the various electrolyte damping means utilized in the present invention permit the use of a very low viscosity, low surface tension coefficient fluid in the level. The use of such a fluid is preferred, as high viscosity fluids which are more or less self-damping do not permit the electrical bubble motion sensing means to function as accurately or to be as sensitive as when low viscosity fluids are utilized.

The device herein described is highly useful as an accelerometer, an instrument for sensing angular changes, and as highly sensitive level. In all cases, a direct output signal is obtained that is a linear function of the angular displacement of the device in the plane in which it is designed to operate. Two such devices placed at right angles to each other will, of course, provide data desired for the detection of all accelerations in or angular displacements from a level plane, and therefore by definition, from an apparent vertical which is defined as the vector resultant of the surrounding force field.

The bubble level as above described, will therefore have a bubble motion that is linear with respect to the angle of level displacement, and when connected to the bridge circuit of Figure 6, the signal produced will be linear with respect to angular displacement of the level.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect and the invention is therefore claimed in any of its forms or modifications within the legitimate and valid scope of the appended claims.

What is claimed is:

1. A bubble level comprising walls forming a chamber, a body of liquid only partly filling said chamber thereby providing a bubble in said chamber, the upper and lower surfaces of said chamber being concentrically curved in one direction only, said upper surfaces being shaped to confine said bubble to a path following the curvature of said upper surface, a pair of spaced electrodes positioned flush in said upper surface, exposed to said liquid, and simultaneously contacted by said bubble in one position thereof, said liquid being conducting, and said entire lower surface of said chamber being conductive, all of said walls other than said electrodes being non-conductive whereby tilt of said level in the plane of said direction will move said bubble to linearly change the areas of said upper electrodes exposed to said conducting lower surface.

2. A bubble level comprising walls forming a chamber, a body of liquid only partly filling said chamber thereby providing a bubble in said chamber, the upper and lower surfaces of said chamber being concentrically curved in one direction only, said upper surface being shaped to confine said bubble to a path following the curvature of said upper surface, a pair of spaced electrodes positioned flush in said upper surface, said liquid being conducting, and said entire lower surface of said chamber being conductive, all of said walls other than said electrodes being non-conductive, said bubble having a size sufficient to bisect both of said electrodes and to form substantially equal current paths between said electrodes and said lower surface through said liquid when said level is level and at rest whereby tilt of said level in the plane of said one direction moves said bubble to linearly and differentially change the areas of said upper electrodes exposed to said lower surfaces.

3. Apparatus in accordance with claim 2 wherein said electrodes are rectangular with a long dimension in line with said path to provide said linear change over a substantial tilt angle range.

4. Apparatus in accordance with claim 2 wherein the current paths between each of said electrodes and said lower surface are connected as legs in a bridge circuit, balanced by a pair of external resistors, means for energizing said electrodes, and means for taking a bridge output across said lower surface and said external resistors.

5. A bubble level comprising a bubble casing enclosing a chamber adapted to hold a conductive electrolyte, said casing having a longitudinally curved upper surface and a concentric longitudinally curved lower surface, said upper surface being mostly of insulative material and having a pair of spaced substantially rectangular conductive surfaces thereon forming a continuation of the curvature of said upper surface, said entire lower surface being conductive and symmetrically spaced below said rectangular conductive surfaces.

6. A bubble level comprising a bubble casing enclosing a chamber adapted to hold a conductive electrolyte, said casing having a longitudinally curved upper surface and a concentric longitudinally curved lower surface, said upper surface being mostly of insulative material and having a pair of spaced substantially rectangular conductive surfaces thereon forming a continuation of the curvature of said upper surface, said entire lower surface being conductive and symmetrically spaced below said rectangular conductive surfaces, and an insulating barrier extending upwardly from said lower surface in a plane bisecting the space between said upper conductive surface, the upper end of said barrier being cut away below said upper surface in bubble contour.

7. A bubble level comprising a bubble casing enclosing a chamber adapted to hold a conductive electrolyte, said casing having a longitudinally curved upper surface and a concentric longitudinally curved lower surface, said upper surface being mostly of insulative material and having a pair of spaced substantially rectangular conductive surfaces thereon forming a continuation of the curvature of said upper surface, said entire lower surface being conductive, an insulating barrier extending upwardly from said lower surface in a plane bisecting the space between said upper conductive surface, the upper end of said barrier being cut away below said upper surface in bubble contour, and means for partially filling said chamber with electrolyte.

8. A bubble level comprising a bubble casing enclosing a chamber adapted to hold a conductive electrolyte, said casing having a longitudinally curved upper surface and a concentric longitudinally curved lower surface, said upper surface being mostly of insulative material and having a pair of spaced substantially rectangular conductive surfaces thereon forming a continuation of the curvature of said upper surface, said entire lower surface being conductive, and an insulating barrier extending upwardly from said lower surface in a plane bisecting the space between said upper conductive surfaces, the upper end of said barrier being cut away below said upper surface in bubble contour, a filling of conductive electrolyte in said chamber of an amount leaving a bubble in said chamber in contact with and bisecting said upper conductive surfaces in one position of said level.

9. A bubble level comprising means forming a chamber having an upper surface curved continuously in one major dimension, means confining movement of a bubble in said chamber to movements along said dimension, a pair of conductive areas spaced on said dimension and of rectilinear extent parallel to and at right angles to said dimension said areas forming continuations of said upper surface, a bottom conductive area in said chamber concentric with said upper surface, electrolyte in said chamber sufficient to provide a hubble confined to said major dimension and in contact with both of said conductive areas, said bubble having a size substantially bisecting said upper conductive areas when said level is level and at rest.

10. A bubble level comprising means forming a chamber having an upper surface curved continuously in one major dimension, means confining movement of a bubble in said chamber to movements along said dimension, a pair of upper conductive areas spaced on said dimension and of rectilinear extent parallel to and at right angles to said dimension said conductive areas being flush with said upper surface, a bottom conductive area in said chamber concentric with said upper surface, electrolyte in said chamber sufficient to provide a bubble confined to said major dimension and in contact with both of said upper conductive layers, said bubble having a size substantially bisecting said upper conductive areas, means for passing a current between said upper and lower conductive areas, and means for measuring variations in current due to bubble motion across said upper conductive areas.

11. Apparatus in accordance with claim 10 wherein said measuring means is an A. C. bridge circuit.

12. Apparatus in accordance with claim 10 wherein said measuring means is a bridge circuit comprising a pair of balancing resistors connected together at one end and to respective upper conductive areas of said bubble level, a source of A. C. connected to said upper areas, and an output circuit connected between the connected ends of said resistors and said bottom conductive area of said bubble level.

13. A device for producing electrical signals representing tilt of a bubble level comprising means forming a bubble chamber having an upper surface curved continuously in one major dimension, said chamber being mounted to have a center of rotation substantially midway along the extent of said major dimension, means confining movement of a bubble in said chamber to movements along said dimension, a pair of upper conductive areas spaced on said dimension equidistant from said center of rotation and extending equal distances along said dimension, said upper conductive areas being flush with said curved upper surface, a bottom conductive area in said chamber directly below, concentric with and of substantially equal major dimensional extent as said upper surface, electrolyte in said chamber sufficient to provide a bubble confined to said major dimension and simultaneously in contact with both of said upper conductive areas when said level is level and at rest, and means for measuring the differential change in current flow through said electrolyte between each of said upper conductive surfaces and said conductive lower surface due to movement of said bubble along said upper surface as a result of tilt of said chamber around said center of rotation in the plane of said major dimension.

14. A device for producing electrical signals representing tilt of a bubble level comprising means forming a bubble chamber having an upper surface curved continuously in one major dimension, said chamber being mounted to have a center of rotation substantially midway along the extent of said major dimension, means confining movement of a bubble in said chamber to movements along said dimension, a pair of upper conductive areas spaced on said dimension equidistant from said center of rotation and extending equal distances along said dimension, said upper conductive areas being flush with said curved upper surface, a bottom conductive area in said chamber directly below, concentric with and of substantially equal major dimensional extent as said upper surface, electrolyte in said chamber sufficient to provide a bubble confined to said major dimension, and simultaneously in contact with and bisecting both of said upper conductive areas when said level is level and at rest, and means for measuring the differential change in current flow through said electrolyte between each of said upper conductive surfaces and said conductive lower surface due to movement of said bubble along said upper surface as a result of tilt of said chamber around said center of rotation in the plane of said major dimension.

15. A device for producing electrical signals as a linear function of the tilt of a bubble level, comprising means forming a bubble chamber having an upper surface curved continuously in one major dimension, said chamber being mounted to have a center of rotation substantially midway along the extent of said major dimension, means confining movement of a bubble in said chamber to movements along said dimension, a pair of upper conductive areas spaced on said dimension equidistant from said center of rotation and extending equal distances along said dimension, said upper conductive areas being flush with said curved upper surface, a bottom conductive area in said chamber directly below, concentric with and of substantially equal major dimensional extent as said upper surface, electrolyte in said chamber sufficient to provide a bubble confined to said major dimension, and simultaneously in contact with, and bisecting both of said upper conductive areas when said level is level and at rest, said bubble having a motion over said upper conductive areas along said upper surface that is a linear function of the tilt of said bubble level a pair of balancing resistors connected together at one end and to respective upper conductive areas of said bubble level, a source of A. C. connected across said upper conductive areas, and an output circuit connected between the connected ends of said resistors and said bottom conductive area of said bubble level, whereby the differential change in current in the two current paths between said upper conductive areas and said lower conductive area due to said linear bubble movement appears as a signal in said output surface which is a linear function of bubble level tilt.

References Cited in the file of this patent

UNITED STATES PATENTS

| | | |
|---|---|---|
| 1,375,278 | Clayton | Apr. 19, 1921 |
| 1,384,062 | Happle | July 12, 1921 |
| 1,506,192 | Meijer | Aug. 26, 1924 |
| 1,593,363 | Schoute | July 20, 1926 |
| 2,252,727 | Pepper | Aug. 19, 1941 |
| 2,286,014 | Rowe | June 9, 1942 |

FOREIGN PATENTS

| | | |
|---|---|---|
| 716,710 | France | 1931 |